(12) United States Patent
Fu et al.

(10) Patent No.: US 8,771,825 B2
(45) Date of Patent: Jul. 8, 2014

(54) PHOTO PAPER

(75) Inventors: Xulong Fu, San Diego, CA (US); Christine E. Steichen, Escondido, CA (US); Lokendra Pal, San Diego, CA (US); Ronald J. Selensky, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/881,702

(22) PCT Filed: Oct. 29, 2010

(86) PCT No.: PCT/US2010/054636
§ 371 (c)(1),
(2), (4) Date: Apr. 25, 2013

(87) PCT Pub. No.: WO2012/057778
PCT Pub. Date: May 3, 2012

(65) Prior Publication Data
US 2013/0216737 A1    Aug. 22, 2013

(51) Int. Cl.
| | | |
|---|---|---|
| *B41M 5/00* | (2006.01) |
| *B44C 1/17* | (2006.01) |
| *G03G 7/00* | (2006.01) |
| *B41M 5/52* | (2006.01) |
| *B32B 27/08* | (2006.01) |
| *B32B 15/08* | (2006.01) |
| *B32B 27/32* | (2006.01) |
| *C04B 41/52* | (2006.01) |
| *C08J 5/18* | (2006.01) |

(52) U.S. Cl.
CPC ............. *B41M 5/52* (2013.01); *B41M 5/5218* (2013.01); *B32B 27/08* (2013.01); *B32B 15/08* (2013.01); *B32B 27/32* (2013.01); *C04B 41/52* (2013.01); *C08J 5/18* (2013.01); *G03G 7/0013* (2013.01)

USPC ........ 428/195.1; 428/201; 428/206; 428/220; 428/325

(58) Field of Classification Search
CPC ....... B41M 5/52; B41M 5/5218; B32B 27/08; B32B 15/08; B32B 27/32; C04B 41/52; C08J 5/18; G03G 7/0013
USPC ........................ 428/195.1, 201, 206, 220, 325
See application file for complete search history.

(56) References Cited

U.S. PATENT DOCUMENTS

| | | | |
|---|---|---|---|
| 6,028,028 A | 2/2000 | Nitta | |
| 6,528,148 B2 | 3/2003 | Niu et al. | |
| 6,989,181 B2 * | 1/2006 | Brandt | ........................ 428/34.7 |
| 7,658,981 B2 | 2/2010 | Teramae | |
| 2002/0146542 A1 * | 10/2002 | Lu et al. | ........................ 428/195 |
| 2004/0033323 A1 | 2/2004 | Gaynor et al. | |
| 2006/0251832 A1 | 11/2006 | Niu et al. | |
| 2007/0207278 A1 | 9/2007 | MukherJee et al. | |
| 2010/0215880 A1 | 8/2010 | Chu et al. | |

FOREIGN PATENT DOCUMENTS

WO    WO 2010/086511 A1 *    8/2010    ............... H05K 1/00

OTHER PUBLICATIONS

Kaolin Clay Pigment index (2011) Malla et al.*

* cited by examiner

*Primary Examiner* — Betelhem Shewareged

(57) ABSTRACT

A sheet of photo paper comprises a substrate, a top coat deposited on the image receiving side of the substrate, a polyethylene coating deposited on the top coat, and an image receiving coating deposited on the polyethylene coating. A method of making a sheet of photo paper, comprising layering a pre-coat onto a substrate, layering a top coat onto the pre-coat, layering a polyethylene coating onto the top coat, and layering an image receiving coating onto the polyethylene coating.

15 Claims, 4 Drawing Sheets

PHOTO PAPER

BACKGROUND

Many consumers today have taken advantage of the advances made to printers and systems for producing photographs. Indeed, the ability of a user to simply send a digital copy of an image to a printer and obtain photographic quality prints has provided the typical consumer with ready access to hardcopies of their photographs and more control over how their photographs look as a finished product.

The quality of a printed photograph depends on a number of factors, including the print medium used to print the photograph. Print media that provide a high-quality printed photograph are usually more costly. For example, micro-porous coated inkjet photo paper can be used to produce hardcopy photographs. However, a higher quality photograph is achieved if a silver halide-based medium is used. The silver halide-based medium is generally more expensive.

Achieving a high image clarity, or distinctness of image (DOI), is more difficult with micro-porous photo paper. Because of tiny imperfections on the surface of the micro-porous photo paper, light reflecting off of the photo paper can result in the image being more fuzzy or blurry than would otherwise occur, for example, if silver halide paper were used.

BRIEF DESCRIPTION OF THE DRAWINGS

The accompanying drawings illustrate various examples of the principles described herein and are a part of the specification. These are merely examples and do not limit the scope of the claims.

Throughout the drawings, identical reference numbers designate similar, but not necessarily identical, elements.

DETAILED DESCRIPTION

Figure 1:
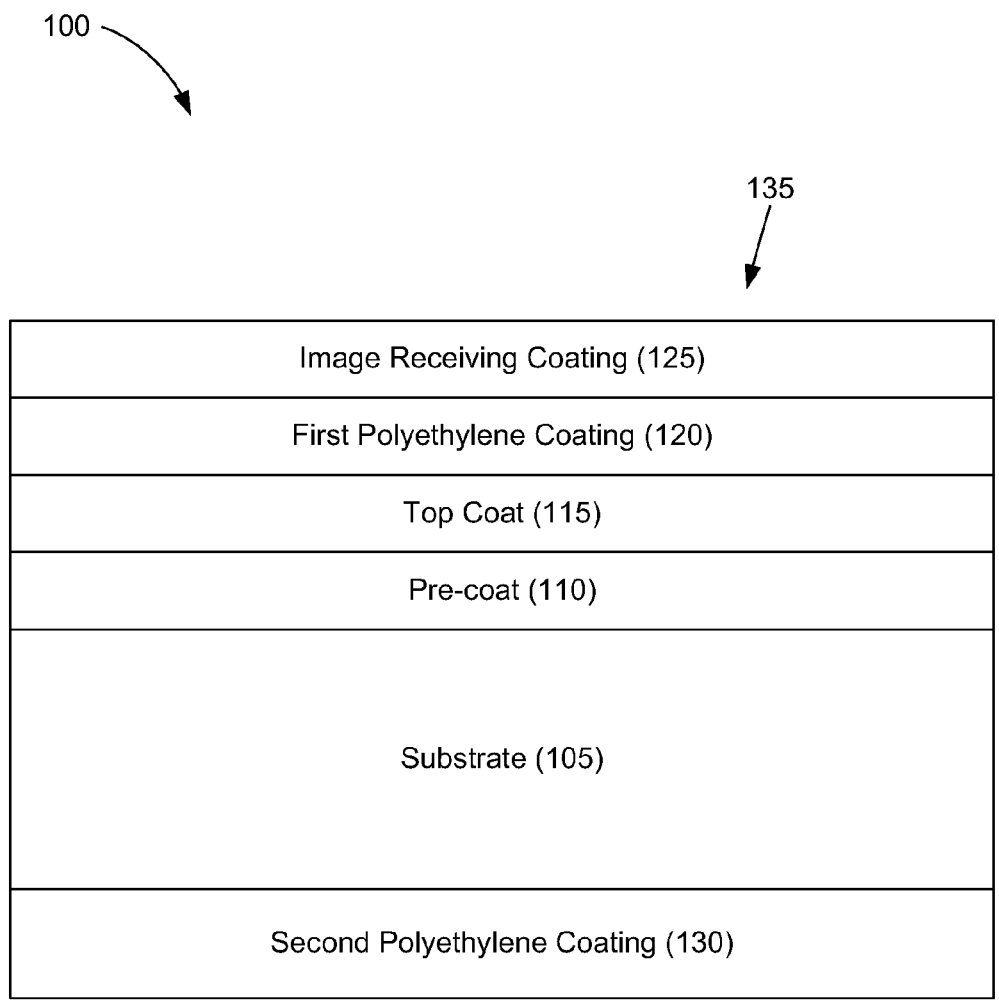
FIG. 1 is an illustrative cross-sectional diagram of a sheet of photo paper, according to one example of principles described herein.

The present specification discloses various systems, apparatus, and methods of formulating a photographic print medium or "photo paper" that provides an increased distinctness of image (DOI). As used herein and in the following claims, the term "photo paper" will be used to refer to a photographic print medium.

As discussed above, it is advantageous to construct photo paper that provides an increased distinctness of image, but is still relatively inexpensive to make. It becomes difficult, however, to overcome what is known in the art as the orange peel effect. The orange peel effect is caused by the tiny imperfections within the substrate of a sheet of photo paper. When a polyethylene layer has been coated on the substrate of the photo paper, the surface of the paper resembles the bumpy surface of the skin of an orange, hence the term "orange peel effect."

Increasing the thickness of the polyethylene coating may increase the distinctness of image printed on the medium, but this becomes relatively more expensive as the thickness of the polyethylene layer is increased. Additionally, there is a threshold thickness of polyethylene which, when reached, will not further increase the distinctness of image provided by the medium.

Thus, in one example of the present system, apparatus, and method, at least a top coat is placed between the substrate and polyethylene coating on the image side of the photo paper. The top coat may comprise relatively small particles of clay, precipitated calcium carbonate (PCC), or combinations thereof in which the mean particle size of the clay and precipitated calcium carbonate (PCC) is less than 0.5 µm (micrometers).

In another example, a pre-coat may be placed in between the first coating and the substrate on the image side of the photo paper. The pre-coat may comprise either ground calcium carbonate (GCC) or a mixture of ground calcium carbonate (GCC) and precipitated calcium carbonate (PCC) wherein the mean particle size of each is less than 1.5 µm (micrometers).

In various other alternative examples, a top coat and pre-coat as well as a second layer of polyethylene may be disposed on the non-image side of the photo paper. This may be done to balance the photo paper as well as control curling that may occur during the manufacturing process of the photo paper.

In the following description, for purposes of explanation, numerous specific details are set forth in order to provide a thorough understanding of the present systems and methods. It will be apparent, however, that the present apparatus, systems and methods may be practiced without these specific details.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As used herein and in the appended claims the term "image receiving coating" is meant to be understood broadly as any coating that can receive an ink; any coating comprising light-sensitive chemicals that, when exposed to a light source, may receive an image; any coating comprising heat sensitive chemicals which, when exposed to heat, may receive an image; or any combination thereof. Throughout the various examples of the present application, for purposes of simplicity the image receiving coating is configured to receive an image from an inkjet printer, specifically, as well as other printing devices.

Additionally, as used herein and in the appended claims, the "image receiving side" is meant to be understood broadly as any side of a sheet of photo paper meant to receive an image.

Additionally, as used herein and in the appended claims, the "distinctness of image" or the "DOI" is meant to be understood broadly as a quantification of the spread of light reflected at the specular angle. The distinctness of image is measured by first projecting light onto a surface at a particular angle. The amount of reflected light is then measured at or around the specular angle; the specular angle being the angle equal to but opposite to the normal of the surface of the reflecting object. Generally, the higher the measurement, the more light is reflected back making the image clearer. Thus, the DOI describes a property of the print medium with or without an image being printed thereon.

When measuring the distinctness of image, (DOI) for any given surface, multiple measurements may be taken in order to obtain an average. This is done because of the varying amounts of the different coatings on the surface of the object. Therefore, although any given example described herein may contain a coating having a certain coat weight, because of manufacturing defects or variances within the manufacturing process, different values of the distinctness of image (DOI) may be measured at different locations on the surface of the object.

Looking first at FIG. 1, an illustrative cross-sectional diagram of a sheet of photo paper (100) is shown. The photo paper (100) comprises a substrate (105), a pre-coat (110), a top coat (115), a first polyethylene coating (120), and an image receiving coating (125) all layered on the image receiving side (135) of the photo paper. The photo paper (100) further comprises a second polyethylene coating (130) on the side of the photo paper (100) opposite that of the image receiving side (135). These various layers will now be described in more detail.

The substrate (105) may be made of any type of material including, but in no way limited to, virgin hardwood fibers, virgin softwood fibers, virgin non-wood fibers, recycled wood and non-wood fibers, as well as other acceptable types of wood and non-wood pulps, among others. In contrast to traditional silver halide image forming methods, inkjet image formation methods include non-contact image deposition methods without the use of any developing liquids. This greatly reduces the effects of contamination. The reduction of contamination allows the present substrate (105) to include any number of fibers including, but not limited to, those materials disclosed above.

A filler material may also be included within the substrate (105). The filler materials include, but are in no way limited to, clay, kaolin, calcium carbonate ($CaCO_3$), gypsum (hydrated calcium sulfate), talc, zeolite, titanium oxide, as well as any other low cost material that may be used to replace cellulose fiber in the substrate (105) such as wood or non-wood fibers or recycled wood or non-wood fibers or combinations thereof.

Additionally, additives may also be added to the substrate (105). Some example of additives that may be added to the substrate (105) include, but are in no way limited to, sizing agents such as metal salts of fatty acids and/or fatty acids, alkyl ketene dimer emulsification products and/or epoxidized higher fatty acid amides; alkenyl or alkylsuccinic acid anhydride emulsification products and rosin derivatives; dry strengthening agents such as anionic, cationic or amphoteric polyacrylamides, polyvinyl alcohol, cationized starch and vegetable galactomannan; wet strengthening agents such as polyaminepolyamide epichlorohydrin resin; fixers such as water-soluble aluminum salts, aluminum chloride, and aluminum sulfate; pH adjustors such as sodium hydroxide, sodium carbonate and sulfuric acid; and coloring agents such as pigments, coloring dyes, and fluorescent brighteners; and combinations thereof.

The pre-coat (110) may then be deposited on top of the substrate (105) by an inline metering size press or may be coated off-line with two tandem coating stations. The pre-coat (110) may be comprised of ground calcium carbonate, precipitated calcium carbonate, or combinations of both. In one example, the pre-coat (110) may include 65 parts of ground calcium carbonate (GCC) (approximately 58.3% by weight) and 35 parts of precipitate calcium carbonate (PCC) (approximately 31.4% by weight). The mean particle size of the ground calcium carbonate (GCC) and precipitate calcium carbonate (PCC) may be less than 1.5 µm (micrometers). The ground and precipitate calcium carbonates are added to the first coating as a pigment.

The pre-coat (110) may further include a water dispersible binder, a water soluble binder, an adhesion promoter and slip aid, an optical brightener, a colorant or dye, or combinations thereof. The water dispersible and water soluble binders may consist of a latex, a mixture of a latex and starch, or a mixture of a latex and polyvinyl alcohol (PVA). Additionally, the latex used in the first coating may be an acrylic latex so as to avoid any color distortions of the printed image due to changes in temperature. Still further, small amounts of a plasticizer, a foaming control agent, and a thickener may also be added.

One example of a pre-coat (110) includes 65 parts (approximately 58.3% by weight) of ground calcium carbonate such as that sold under the trade name of HYDROCARB® 60 by Omya, Inc.; 35 parts (approximately 31.4% by weight) of precipitated calcium carbonate such as that sold under the trade name of OPACARB® A40 or OPACARB® 3000 by Specialty Minerals Inc. (SMI); 10 parts (approximately 9.0% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as 2-hydroxyethyl starch ether sold under the trade name of PENFORD® Gum 280 by Penford Products Co.; 0.5 parts (approximately 0.4% by weight) of an optical brightener such as tetrasulfonated stilbene compound commercially available under the designation Tinopal ABP-A from Chemische Industrie Basel (Ciba); and 0.005 parts (approximately 0.004% by weight) of a colorant or dye such as that sold under the trade name IRGALITE® Blue Dye by Chemische Industrie Basel (Ciba). In this particular example, the pre-coat's (110) coat weight is 12 gsm (grams per square meter) or greater. In other examples, the pre-coats' (110) coat weight may be up to 25 grams per square meter (gsm).

The top coat (115) may then be deposited on top of the pre-coat (110) and may be comprised of ground calcium carbonate (GCC), precipitated calcium carbonate (PCC), clay, synthetic clay, titanium dioxide, synthetic polymers, a water dispersible binder, a water soluble binder, an adhesion promoter and slip aid, an optical brightener, a colorant or dye, or combinations thereof. The ground and precipitate calcium carbonate as well as the clay, if used, will act as a pigment and may have a particle size of 0.5 µm. Also, the water dispersible and water soluble binders may consist of a latex, a mixture of a latex and starch, or a mixture of a latex and polyvinyl alcohol (PVA). Additionally, the latex used in the second coating (115) may be an acrylic latex so as to avoid any color distortions of the printed image due to changes in temperature. Still further, the total amount of coating color may contain up to 10% of a plastic pigment to increase surface gloss of the final product as well as better adhere the top coat (115) to the first polyethylene coating (120). Still further, small amounts of a plasticizer, a foaming control agent, and a thickener may also be added.

In one example, the top coat (115) may include 100 parts (approximately 85.8% by weight) of a precipitated calcium carbonate such as OPACARB® A40 or OPACARB® 3000 by Specialty Minerals Inc. (SMI); 6 parts (approximately 5.2% by weight) of a synthetic polymer such as DOW HS3020 NA by Dow Corning Corporation (DOW); 9 parts (approximately 7.7% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as 2-hydroxyethyl starch ether sold under the trade name of Penford® Gum 280 by Penford Products Co.; and 0.5 parts (approximately 0.4% by weight) of calcium stearate ($C_{36}H_{70}CaO_4$). In this particular example, the top coat's (115) coat weight is 10 gsm (grams per square meter). In other examples, the top coat's (115) coat weight may be up to 20 grams per square meter (gsm).

In another example, the top coat (115) may include 40 parts (approximately 35.2% by weight) of a precipitated calcium carbonate such as OPACARB® A40 or OPACARB® 3000 by Specialty Minerals Inc. (SMI); 54 parts (approximately 47.6% by weight) of a clay such as MIRAGLOSS® by Engelhard Corporation; 6 parts (approximately 5.3% by weight) of a synthetic polymer such as DOW HS3020 NA by Dow Corning Corporation (DOW); 10 parts (approximately 8.8% by weight) of a water dispersible binder such as an aqueous dispersion of a copolymer of styrene and 1,3 butadiene sold under the trade name Litex PX 9330 by Baden Aniline and Soda Factory (BASF); 3 parts (approximately 2.6% by weight) of a water soluble binder such as 2-hydroxyethyl starch ether sold under the trade name of Penford® Gum 280 by Penford Products Co.; and 0.5 parts (approximately 0.4% by weight) of calcium stearate ($C_{36}H_{70}CaO_4$). In this particular example, the top coat's (115) coat weight is 10 gsm (grams per square meter). In other examples, the top coat's (115) coat weight may be up to 20 grams per square meter (gsm).

In yet another example, the top coat (115) may include 100 parts (approximately 76.6% by weight) of a synthetic clay such as hydrous sodium lithium magnesium silicate for example LAPONITE® by Southern Clay Products, Inc.; 10 parts (approximately 7.7% by weight) of a synthetic polymer such as DOW HS3020 NA by Dow Corning Corporation (DOW); 20 parts (approximately 15.3% by weight) of a water dispersible binder such as an aqueous dispersion of a copolymer of styrene and 1,3 butadiene sold under the trade name Litex PX 9330 by Baden Aniline and Soda Factory (BASF); and 0.5 parts (approximately 0.4% by weight) of calcium stearate ($C_{36}H_{70}CaO_4$). In this particular example, the top coat's (115) coat weight is 10 gsm (grams per square meter). In other examples, the top coat's (115) coat weight may be up to 20 grams per square meter (gsm).

In still another example, the top coat (115) may include 10 parts (approximately 66.7% by weight) of titanium dioxide; 5 parts (approximately 33.3% by weight) of a water dispersible binder such as an aqueous dispersion of a copolymer of styrene and 1,3 butadiene sold under the trade name Litex PX 9330 by Baden Aniline and Soda Factory (BASF); and 0.005 parts (approximately 0.03% by weight) of a colorant or dye such as IRGALITE® Blue Dye by Chemische Industrie Basel (Ciba). In this particular example, the top coat's (115) coat weight is 5 gsm (grams per square meter). In other examples, the top coat's (115) coat weight may be up to 20 grams per square meter (gsm).

The first polyethylene (PE) layer (120) may then be deposited on top of the top coat (115). A second polyethylene coating (130) may be added to the opposite side of the substrate to help in controlling curling of the photo paper (100). Both the first and second polyethylene coatings (120, 130) may be deposited on the photo paper (100) by, for example, an extrusion process.

As briefly discussed earlier, the amount of polyethylene deposited onto a substrate (105) can only be increased to a certain level before the corresponding distinctness of image (DOI) is no longer increased by more polyethylene. Additionally, it is less economical to add large amounts of polyethylene in an attempt to increase the distinctness of image. Therefore, in one example, the first polyethylene (PE) layer (120) may have a polyethylene (PE) coat weight of anywhere between 12 gsm and 28 gsm (grams per square meter). In another example, the first polyethylene (PE) layer (120) may have a polyethylene (PE) coat weight of anywhere between 12 gsm and 18 gsm (grams per square meter). Still further, in another example, the first polyethylene (PE) layer (120) may have a polyethylene (PE) coat weight of anywhere between 23 gsm and 29 gsm (grams per square meter). In yet another example, the first polyethylene (PE) layer (120) may have a polyethylene (PE) coat weight of 15 gsm (grams per square meter). In yet another example, the first polyethylene (PE) layer (120) may have a polyethylene (PE) coat weight of 26 gsm (grams per square meter).

The polyethylene (PE) coat weight of the second polyethylene coating (130) is deposited on the side opposite the image receiving side (135) to counter balance the curl generated by polyethylene (PE) layers and the ink receiving layer. Therefore, the coat weight of the second polyethylene coating (130) is dependant on the polyethylene (PE) weight of the first polyethylene (PE) layer (120) as well as the coat weight of the image receiving coating (125). The polyethylene (PE) coat weight ratio between the second polyethylene layer (130) and the first polyethylene layer (120) can be 2 to 1.

An image receiving coating (125) may then be deposited over the first polyethylene coating (120). The imaging layer in present invention can comprise a porous ink recording medium. In one example, the inorganic pigment can include any number of inorganic oxide groups including, but not limited to, silica and/or alumina, including those treated with silane coupling agents containing functional groups or other agents such as aluminum chlorohydrate (ACH). If silica is used, it can be selected from the following group of commercially available fumed silica: Cab-O-Sil LM-150, Cab-O-Sil M-5, Cab-O-Sil MS-55, Cab-O-Sil MS-75D, Cab-O-Sil H-5, Cab-O-Sil HS-5, Cab-O-Sil EH-5, Orisil 200, Orisil 300, Aerosil 150, Aerosil 200, Aerosil 300, Aerosil 350, and Aerosil 400.

Commercially available alumina particles can also be used. In one example, the substrate can be coated with fumed silica (modified or unmodified). In this example, the silica may be in colloidal form. Specifically, in one example, the aggregate size of the fumed silica can be between approximately 50 to 300 nm in size. More specifically, the fumed silica can be between approximately 100 to 250 nm in size. The Brunauer-Emmett-Teller (BET) surface area of the fumed silica can be between approximately 100 to 400 square meters per gram. More specifically, the fumed silica can have a Brunauer-Emmett-Teller (BET) surface area of 150 to 300 square meters per gram.

Alternatively, the substrate may be coated with an alumina (modified or unmodified). In one example, the alumina coating can comprise pseudo-boehmite, which is aluminum oxide/hydroxide ($Al_2O_3 \cdot n\, H_2O$ where n is from 1 to 1.5). Additionally, in another example, the substrate (105) can be coated with an alumina that comprises rare earth-modified boehmite, such as those selected from lanthanum, ytterbium, cerium, neodymium, praseodymium, and mixtures thereof.

As mentioned above, the layer of fumed silica or alumina can be treated with silane coupling agents containing functional groups, aluminum chlorohydrate (ACH), and/or other functional or modifying materials. Additionally, the ink-receiving layer may also include any number of surfactants, buffers, plasticizers, and other additives.

During application, the ink-receiving layer can be coated onto the substrate by any number of material dispensing machines including, but not limited to, a slot coater, a curtain coater, a cascade coater, a blade coater, a rod coater, a gravure coater, a Mylar rod coater, a wired coater, or the like.

Table 1 below shows the normalized individual distinctness of image (DOI) measurements as well as their average for the photo paper (100) of FIG. 1 with a polyethylene coating layer of 15 gsm (grams per square meter). The normalized distinctness of image (DOI) results were calculated by dividing the individual distinctness of image (DOI) measurements by the image side (135) polyethylene (PE) coat weight. The control comprises a substrate having a 15 gsm (grams per square meter) polyethylene coating layer applied thereon and does not include the pre-coat (110) or top coat (115). The normalized distinctness of image (DOI) results for the control were also calculated by dividing the individual distinctness of image (DOI) measurements by the image side (135) polyethylene (PE) coat weight.

TABLE 1

| Polyethylene Coating (120) at 15 gsm | Control (mm$^{-1}$/gsm) | FIG. 1 Photo Paper (100, 200) (mm$^{-1}$/gsm) |
| --- | --- | --- |
| Measurement 1 | 0.115 | 0.227 |
| Measurement 2 | 0.109 | 0.203 |
| Measurement 3 | 0.111 | 0.224 |
| Measurement 4 | 0.097 | 0.217 |
| Measurement 5 | 0.123 | 0.216 |
| Average | 0.111 | 0.217 |

Additionally, Table 2 shows the gloss measurements (% per 20 degrees angle measurement) for the control and photo paper (100) of Table 1.

TABLE 2

| Polyethylene Coating (120) at 15 gsm | Control (Gloss % at 20°) | FIG. 1 Photo Paper (100, 200) (Gloss % at 20°) |
| --- | --- | --- |
| Measurement 1 | 18.4 | 26 |
| Measurement 2 | 18.6 | 26.2 |
| Measurement 3 | 18.3 | 25.1 |
| Measurement 4 | 18.2 | 26.1 |
| Measurement 5 | 19.2 | 25.5 |
| Average | 18.5 | 25.8 |

Likewise, Table 3 below shows the normalized individual distinctness of image (DOI) measurements as well as their average for the photo paper (100) of FIG. 1 with a polyethylene coating layer of 26 gsm (grams per square meter). Again, the control is a substrate having a 26 gsm (grams per square meter) polyethylene coating layer applied thereon and does not include a pre-coat (110) or top coat (115).

TABLE 3

| Polyethylene Coating (120) at 26 gsm | Control (mm$^{-1}$/gsm) | FIG. 1 Photo Paper (100, 200) (mm$^{-1}$/gsm) |
| --- | --- | --- |
| Measurement 1 | 0.105 | 0.159 |
| Measurement 2 | 0.102 | 0.137 |
| Measurement 3 | 0.126 | 0.160 |
| Measurement 4 | 0.098 | 0.152 |
| Measurement 5 | 0.101 | 0.147 |
| Average | 0.106 | 0.151 |

Still further, Table 4 shows the gloss measurements (% per 20 degrees angle measurement) for the control and photo paper (100) of Table 3.

TABLE 4

| Polyethylene Coating (120) at 26 gsm | Control (Gloss % at 20°) | FIG. 1 Photo Paper (100, 200) (Gloss % at 20°) |
| --- | --- | --- |
| Measurement 1 | 24.2 | 28 |
| Measurement 2 | 24.3 | 28.6 |
| Measurement 3 | 25.1 | 28.7 |
| Measurement 4 | 24.5 | 28.4 |
| Measurement 5 | 24.7 | 28.1 |
| Average | 24.6 | 28.4 |

Figure 2:
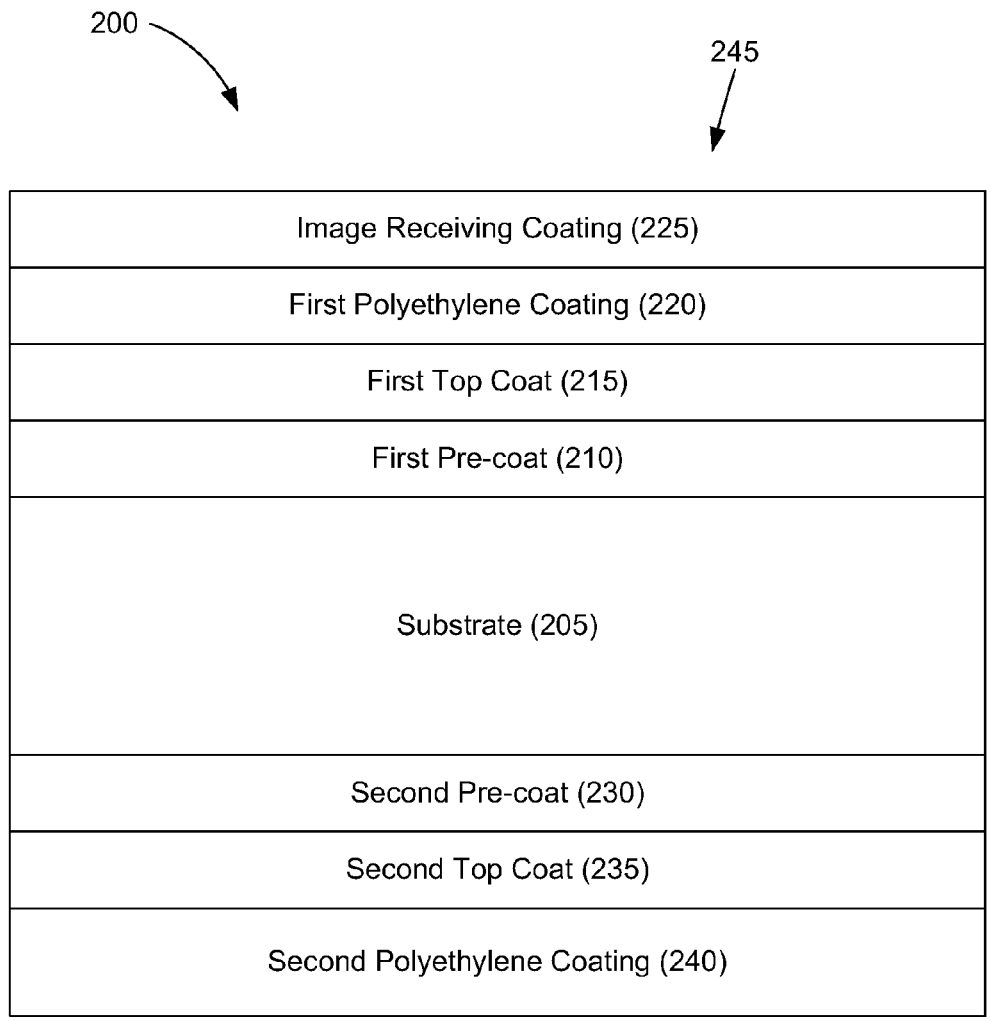
FIG. 2 is an illustrative cross-sectional diagram of a sheet of photo paper, according to another example of principles described herein.

Turning now to FIG. 2, another illustrative cross-sectional diagram of a sheet of photo paper (200) is shown. The photo paper (200) comprises a substrate (205), a first pre-coat (210), a first top coat (215), a first polyethylene coating (220), and an image receiving coating (225) all layered on the image receiving side (245) of the photo paper (200). The photo paper (200) further comprises a second pre-coat (230), a second top coat (235), and a second polyethylene coating (240) on the side of the photo paper (200) opposite that of the image receiving side (245). These coatings will now be described in more detail.

The substrate (205) may be made of any type of material including, but in no way limited to, virgin hardwood fibers, virgin softwood fibers, virgin non-wood fibers, recycled wood and non-wood fibers, as well as other acceptable types of wood and non-wood pulps. In contrast to traditional silver halide image forming methods, inkjet image formation methods include non-contact image deposition methods without the use of any developing liquids. This greatly reduces the possible effect of contamination. The reduction of contamination allows the present substrate (205) to include any number of fibers including, but not limited to, those materials disclosed above.

A filler material may also be included within the substrate. The filler materials include, but are in no way limited to, clay, kaolin, calcium carbonate ($CaCO_3$), gypsum (hydrated calcium sulfate), titanium oxide, as well as any other low cost material which may be used to replace cellulose fiber in the substrate (205).

Additionally, additives may also be added to the substrate (205). Some example of additives that may be added to the substrate (205) include, but are in no way limited to, sizing agents such as metal salts of fatty acids and/or fatty acids, alkyl ketene dimer emulsification products and/or epoxidized higher fatty acid amides; alkenyl or alkylsuccinic acid anhydride emulsification products and rosin derivatives; dry strengthening agents such as anionic, cationic or amphoteric polyacrylamides, polyvinyl alcohol, cationized starch and vegetable galactomannan; wet strengthening agents such as polyaminepolyamide epichlorohydrin resin; fixers such as water-soluble aluminum salts, aluminum chloride, and aluminum sulfate; pH adjustors such as sodium hydroxide, sodium carbonate and sulfuric acid; coloring agents such as pigments, coloring dyes, and fluorescent brighteners; and combinations thereof.

The first pre-coat (210) may then be deposited on top of the substrate (205) by an inline metering size press or may be coated off-line with two tandem coating stations. The first pre-coat (210) may be comprised of ground calcium carbonate, precipitated calcium carbonate, or combinations of both. In one example, the first pre-coat (210) may include 65 parts of ground calcium carbonate (GCC) (approximately 58.3% by weight) and 35 parts of precipitate calcium carbonate (PCC) (approximately 31.4% by weight). The mean particle size of the ground calcium carbonate (GCC) and precipitate calcium carbonate (PCC) may be less than 1.5 µm (micrometers). The ground and precipitate calcium carbonates are added to the first coating (210) as a pigment.

The first pre-coat (210) may further include a water dispersible binder, a water soluble binder, an adhesion promoter and slip aid, an optical brightener, a colorant or dye, or combinations thereof. The water dispersible and water soluble binders may consist of a latex, a mixture of a latex and starch, or a mixture of a latex and polyvinyl alcohol (PVA). Additionally, the latex used in the first pre-coat (210) may be an acrylic latex so as to avoid any color distortions of the printed image due to changes in temperature. Still further, small amounts of a plasticizer, a foaming control agent, and a thickener may also be added.

One example of a first pre-coat (210) may include, 65 parts (approximately 58.3% by weight) of ground calcium carbonate such as HYDROCARB® 60 by Omya, Inc.; 35 parts (approximately 31.4% by weight) of precipitated calcium carbonate such as OPACARB® A40 or OPACARB® 3000 by Specialty Minerals Inc. (SMI); 10 parts (approximately 9.0% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as 2-hydroxyethyl starch ether sold under the trade name of PENFORD® Gum 280 by Penford Products Co.; 0.5 parts (approximately 0.4% by weight) of an optical brightener such as tetrasulfonated stilbene compound commercially available under the designation Tinopal ABP-A from Chemische Industrie Basel (Ciba); and 0.005 parts (approximately 0.004% by weight) of a colorant or dye such as IRGALITE® Blue Dye by Chemische Industrie Basel (Ciba). In this particular example, the first pre-coat's (210) coat weight is 12 gsm (grams per square meter) or greater. In other examples, the first pre-coat's (210) coat weight may be up to 25 grams per square meter (gsm).

The first top coat (215) may then be deposited on top of the first pre-coat (210) and may be comprised of ground calcium carbonate (GCC), precipitated calcium carbonate (PCC), clay, synthetic clay, titanium dioxide, synthetic polymers, a water dispersible binder, a water soluble binder, an adhesion promoter and slip aid, an optical brightener, a colorant or dye, or combinations thereof. The ground and precipitate calcium carbonate as well as the clay, if used, will act as a pigment and each may have a particle size of 0.5 µm. Also, the water dispersible and water soluble binders may consist of a latex, a mixture of a latex and starch, or a mixture of a latex and polyvinyl alcohol (PVA). Additionally, the latex used in the first top coat (215) may be an acrylic latex so as to avoid any color distortions of the printed image due to changes in temperature. Still further, the total amount colorant or dye may contain up to 10% of a plastic pigment to increase surface gloss of the final product as well as better adhere the first top coat (215) to either the first polyethylene coating (220) or first pre-coat (210). Still further, small amounts of a plasticizer, a foaming control agent, and a thickener may be added to the first top coat (215).

In one example, the first top coat (215) may include 100 parts (approximately 85.8% by weight) of a precipitated calcium carbonate such as OPACARB® A40 or OPACARB® 3000 by Specialty Minerals Inc. (SMI); 6 parts (approximately 5.2% by weight) of a synthetic polymer such as DOW HS3020 NA by Dow Corning Corporation (DOW); 9 parts (approximately 7.7% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as 2-hydroxyethyl starch ether sold under the trade name of Penford® Gum 280 by Penford Products Co.; and 0.5 parts (approximately 0.4% by weight) of calcium stearate ($C_{36}H_{70}CaO_4$). In this particular example, the first top coat's (215) coat weight is 10 gsm (grams per square meter). In other examples, the first top coat's (215) coat weight may be up to 20 grams per square meter (gsm).

In another example, the first top coat (215) may include 40 parts (approximately 35.2% by weight) of a precipitated calcium carbonate such as that offered under the trade name OPACARB® A40 or OPACARB® 3000 by Specialty Minerals Inc. (SMI); 54 parts (approximately 47.6% by weight) of a clay such as that offered under the trade name MIRA-GLOSS® by Engelhard Corporation; 6 parts (approximately 5.3% by weight) of a synthetic polymer such as DOW HS3020 NA by Dow Corning Corporation (DOW); 10 parts (approximately 8.8% by weight) of a water dispersible binder such as an aqueous dispersion of a copolymer of styrene and 1,3 butadiene sold under the trade name Litex PX 9330 by Baden Aniline and Soda Factory (BASF); 3 parts (approximately 2.6% by weight) of a water soluble binder such as 2-hydroxyethyl starch ether sold under the trade name of Penford® Gum 280 by Penford Products Co.; and 0.5 parts (approximately 0.4% by weight) of calcium stearate ($C_{36}H_{70}CaO_4$). In this particular example, the first top coat's (215) coat weight is 10 gsm (grams per square meter). In other examples, the first top coat's (215) coat weight may be up to 20 grams per square meter (gsm).

In yet another example, the first top coat (215) may include 100 parts (approximately 76.6% by weight) of a synthetic clay such as hydrous sodium lithium magnesium silicate for example LAPONITE® by Southern Clay Products, Inc.; 10 parts (approximately 7.7% by weight) of a synthetic polymer such as DOW HS3020 NA by Dow Corning Corporation (DOW); 20 parts (approximately 15.3% by weight) of a water dispersible binder such as an aqueous dispersion of a copolymer of styrene and 1,3 butadiene sold under the trade name Litex PX 9330 by Baden Aniline and Soda Factory (BASF); and 0.5 parts (approximately 0.4% by weight) of calcium stearate ($C_{36}H_{70}CaO_4$). In this particular example, the first top coat's (215) coat weight is 10 gsm (grams per square meter). In other examples, the first top coat's (215) coat weight may be up to 20 grams per square meter (gsm).

In still another example, the first top coat (215) may include 10 parts (approximately 66.7% by weight) of titanium dioxide; 5 parts (approximately 33.3% by weight) of a water dispersible binder such as an aqueous dispersion of a copolymer of styrene and 1,3 butadiene sold under the trade name Litex PX 9330 by Baden Aniline and Soda Factory (BASF); and 0.005 parts (approximately 0.03% by weight) of a colorant or dye such as IRGALITE® Blue Dye by Chemische Industrie Basel (Ciba). In this particular example, the first top coat's (215) coat weight is 5 gsm (grams per square meter). In other examples, the first top coat's (215) coat weight may be up to 20 grams per square meter (gsm).

A first polyethylene (PE) layer (220) may then be deposited on top of the first top coat (215) with an image receiving coating (225) deposited over the first polyethylene coating (220). In addition, a second pre-coat (230) and second top coat (235) may be added to the substrate (205) opposite the image receiving side (245). The second pre-coat (230) and second top coat (235) may be similar to the composition of the first pre-coat (210) and first top coat (215) respectively. Therefore, in one example, the second pre-coat (230) may be comprised of ground calcium carbonate, precipitated calcium carbonate, or combinations of both. In one example, the second pre-coat (230) may include 65 parts of ground calcium carbonate (GCC) (approximately 58.3% by weight) and 35 parts of precipitate calcium carbonate (PCC) (approximately 31.4% by weight). The mean particle size of the ground calcium carbonate (GCC) and precipitate calcium carbonate (PCC) may be less than 1.5 μm (micrometers). The ground and precipitate calcium carbonates are added to the third coating (210) as a pigment.

The second pre-coat (230) may further include a water dispersible binder, a water soluble binder, an adhesion promoter and slip aid, an optical brightener, a colorant or dye, or combinations thereof. The water dispersible and water soluble binders may consist of a latex, a mixture of a latex and starch, or a mixture of a latex and polyvinyl alcohol (PVA). Specifically, the latex used in the second pre-coat (230) may be an acrylic latex so as to avoid any color distortions of the printed image due to changes in temperature. Still further, small amounts of a plasticizer, a foaming control agent, and a thickener may also be added.

One example of a second pre-coat (230) may include, 65 parts (approximately 58.3% by weight) of ground calcium carbonate such as HYDROCARB® 60 by Omya, Inc.; 35 parts (approximately 31.4% by weight) of precipitated calcium carbonate such as OPACARB® A40 or OPACARB® 3000 by Specialty Minerals Inc. (SMI); 10 parts (approximately 9% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as 2-hydroxyethyl starch ether sold under the trade name of PENFORD® Gum 280 by Penford Products Co.; 0.5 parts (approximately 0.4% by weight) of an optical brightener such as tetrasulfonated stilbene compound commercially available under the designation Tinopal ABP-A from Chemische Industrie Basel (Ciba); and 0.005 parts (approximately 0.004% by weight) of a colorant or dye such as IRGALITE® Blue Dye by Chemische Industrie Basel (Ciba). In this particular example, the second pre-coat's (230) coat weight is 12 gsm (grams per square meter) or greater. In other examples, the second pre-coat's (230) coat weight may be up to 25 grams per square meter (gsm).

The second top coat (235) may then be deposited on top of the second pre-coat (230) and may be comprised of ground calcium carbonate (GCC), precipitated calcium carbonate (PCC), clay, synthetic clay, titanium dioxide, synthetic polymers, a water dispersible binder, a water soluble binder, an adhesion promoter and slip aid, an optical brightener, a colorant or dye, or combinations thereof. The ground and precipitate calcium carbonate as well as the clay, if used, will act as a pigment and may have a particle size of 0.5 μm. Also, the water dispersible and water soluble binders may consist of a latex, a mixture of a latex and starch, or a mixture of a latex and polyvinyl alcohol (PVA). Additionally, the latex used in the second top coat (235) may be an acrylic latex so as to avoid any color distortions of the printed image due to changes in temperature. Still further, the total amount colorant or dye may contain up to 10% of a plastic pigment to increase surface gloss of the final product as well as better adhere the second top coat (235) to the second pre-coat (230) or second polyethylene coating (240). Still further, small amounts of a plasticizer, a foaming control agent, and a thickener may also be added.

In one example, the second top coat (235) may include 100 parts (approximately 85.8% by weight) of a precipitated calcium carbonate such as OPACARB® A40 or OPACARB® 3000 by Specialty Minerals Inc. (SMI); 6 parts (approximately 5.2% by weight) of a synthetic polymer such as DOW HS3020 NA by Dow Corning Corporation (DOW); 9 parts (approximately 7.7% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as 2-hydroxyethyl starch ether sold under the trade name of Penford® Gum 280 by Penford Products Co.; and 0.5 parts (approximately 0.4% by weight) of calcium stearate ($C_{36}H_{70}CaO_4$). In this particular example, the second top coat's (235) coat weight is 10 gsm (grams per square meter). In other examples, the second top coat's (235) coat weight may be up to 20 grams per square meter (gsm).

In another example, the second top coat (235) may include 40 parts (approximately 35.2% by weight) of a precipitated calcium carbonate such as OPACARB® A40 or OPACARB® 3000 by Specialty Minerals Inc. (SMI); 54 parts (approximately 47.6% by weight) of a clay such as MIRAGLOSS® by Engelhard Corporation; 6 parts (approximately 5.3% by weight) of a synthetic polymer such as DOW HS3020 NA by Dow Corning Corporation (DOW); 10 parts (approximately 8.8% by weight) of a water dispersible binder such as an aqueous dispersion of a copolymer of styrene and 1,3 butadiene sold under the trade name Litex PX 9330 by Baden Aniline and Soda Factory (BASF); 3 parts (approximately 2.6% by weight) of a water soluble binder such as 2-hydroxyethyl starch ether sold under the trade name of Penford® Gum 280 by Penford Products Co.; and 0.5 parts (approximately 0.4% by weight) of calcium stearate ($C_{36}H_{70}CaO_4$). In this particular example, the second top coat's (235) coat weight is 10 gsm (grams per square meter). In other examples, the second top coat's (235) coat weight may be up to 20 grams per square meter (gsm).

In yet another example, the second top coat (235) may include 100 parts (approximately 76.6% by weight) of a synthetic clay such as hydrous sodium lithium magnesium silicate for example LAPONITE® by Southern Clay Products, Inc.; 10 parts (approximately 7.7% by weight) of a synthetic polymer such as DOW HS3020 NA by Dow Corning Corporation (DOW); 20 parts (approximately 15.3% by weight) of a water dispersible binder such as an aqueous dispersion of a copolymer of styrene and 1,3 butadiene sold under the trade name Litex PX 9330 by Baden Aniline and Soda Factory (BASF); and 0.5 parts (approximately 0.4% by weight) of calcium stearate ($C_{36}H_{70}CaO_4$). In this particular example, the second top coat's (235) coat weight is 10 gsm (grams per square meter). In other examples, the second top coat's (235) coat weight may be up to 20 grams per square meter (gsm).

In still another example, the second top coat (235) may include 10 parts (approximately 66.7% by weight) of titanium dioxide; 5 parts (approximately 33.3% by weight) of a water dispersible binder such as an aqueous dispersion of a copolymer of styrene and 1,3 butadiene sold under the trade name Litex PX 9330 by Baden Aniline and Soda Factory (BASF); and 0.005 parts (approximately 0.03% by weight) of a colorant or dye such as IRGALITE® Blue Dye by Chemische Industrie Basel (Ciba). In this particular example, the second top coat's (235) coat weight is 5 gsm (grams per square meter). In other examples, the second top coat's (235) coat weight may be up to 20 grams per square meter (gsm).

The second pre-coat (230) and second top coat (235) may be added so as to create a balance in the photo paper (200) as well as provide a more aesthetically appealing sheet (200) even though the side opposite the image receiving side (245) does not have an image receiving coating (225) thereon. An image receiving layer (225) may also be added to the side opposite the image receiving side (245) so that the side opposite the image receiving side (245) may also have an image.

A second polyethylene (PE) layer (240) may then be deposited on top of the second top coat (235). The second polyethylene coating (240) may be added to the opposite side of the substrate (205) to help in controlling curling of the photo paper (100). Both the first and second polyethylene coatings (220, 240) may be deposited on the photo paper (200) by, for example, an extrusion process.

As discussed above, the amount of polyethylene deposited onto a substrate (205) can only be increased to a certain level until any corresponding gains in distinctness of image cease. Additionally, it is less economical to add larger amounts of polyethylene in an attempt to increase the distinctness of image. Therefore, in one example, the first polyethylene (PE) layer (220) may have a polyethylene (PE) coat weight of anywhere between 12 gsm and 28 gsm (grams per square meter). In another example, the first polyethylene (PE) layer (220) may have a polyethylene (PE) coat weight of anywhere between 12 gsm and 18 gsm (grams per square meter). Still further, in another example, the first polyethylene (PE) layer (220) may have a polyethylene (PE) coat weight of anywhere between 23 gsm and 29 gsm (grams per square meter). In yet another example, the first polyethylene (PE) layer (220) may have a polyethylene (PE) coat weight of 15 gsm (grams per square meter). In yet another example, the first polyethylene (PE) layer (220) may have a polyethylene (PE) coat weight of 26 gsm (grams per square meter).

The polyethylene (PE) coat weight of the second polyethylene coating (240) is deposited on the side opposite the image receiving side (245) to counter balance the curl generated by the first polyethylene (PE) layers and ink receiving layer. Therefore, the coat weight of the second polyethylene coating (240) is dependant on the first polyethylene (PE) layer (220) as well as the coat weight of the image receiving coating (225). The polyethylene (PE) coat weight ratio between the second polyethylene layer (240) and the first polyethylene layer (220) can be 2 to 1.

To show the impact of the coat weight of first polyethylene layer on distinctness of image (DOI) and gloss, two different coat weights (15 gsm and 26 gsm) are shown as an example in tables 1 through 4 above. As can be seen from tables 1 through 4, with the control design there was no difference seen in normalized distinctness of image (DOI) amongst the different polyethylene (PE) coat weights. However, with the photo paper (100), the normalized distinctness of image (DOI) showed an increase. Tables 1 through 4 above show comparable normalized distinctness of image (DOI) and gloss measurements for a sheet of photo paper (200) depicted in FIG. 2. Specifically, Tables 1 and 3 show comparable normalized distinctness of image (DOI) measurements as well as their average for the photo paper (200) of FIG. 2 with a polyethylene coating layer of 15 gsm (grams per square meter) and 26 gsm (grams per square meter) respectively. The normalized distinctness of image (DOI) measurements showed an increase for the photo paper (200) at both polyethylene coat weights as compared to the control design. Additionally, Tables 2 and 4 show the gloss measurements (% per 20 degrees angle measurement) for the photo paper (200) of FIG. 2 with a polyethylene coating layer of 15 gsm (grams per square meter) and 26 gsm (grams per square meter) respectively.

Figure 3:
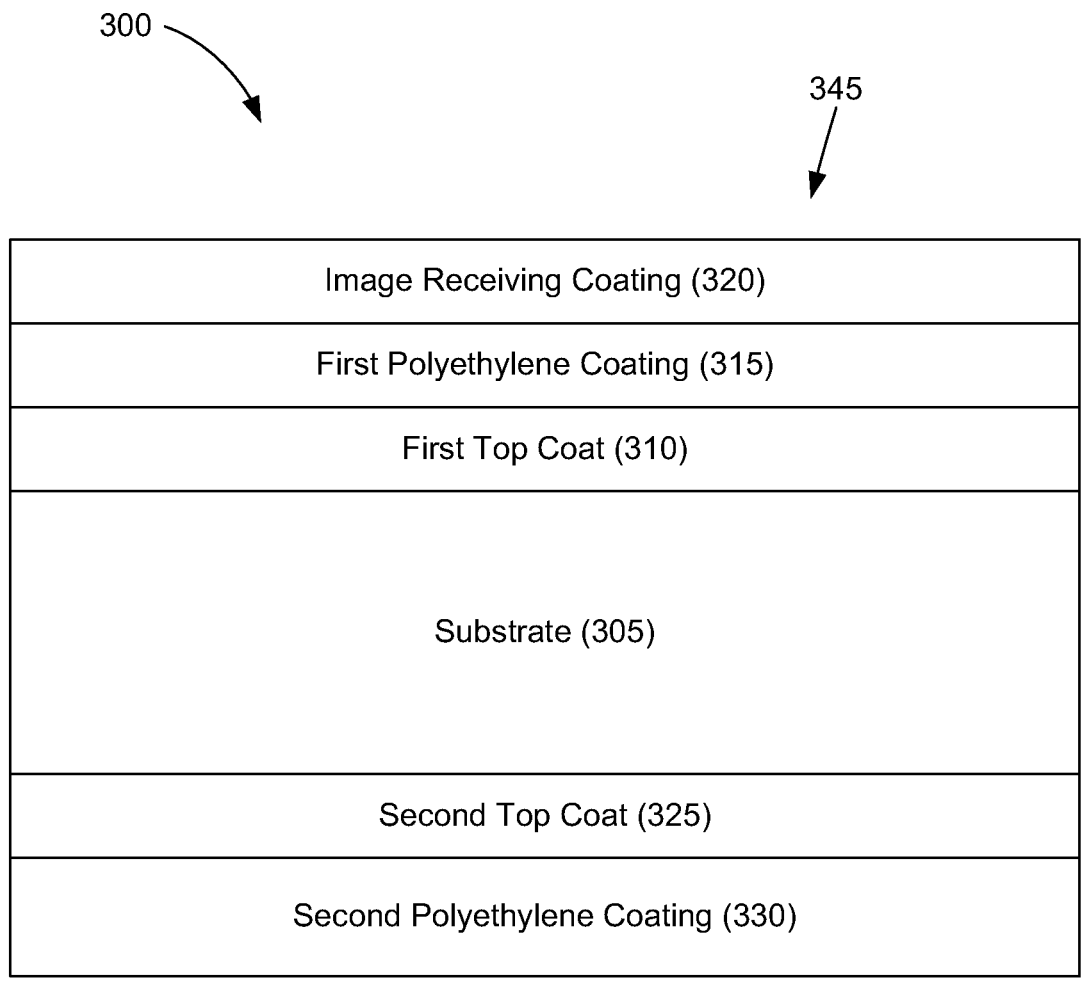
FIG. 3 is an illustrative cross-sectional diagram of a sheet of photo paper, according to another example of principles described herein.

Turning now to FIG. 3, another illustrative cross-sectional diagram of a sheet of photo paper (300) is shown. The photo paper (300) comprises a substrate (305), a first top coat (310), a first polyethylene coating (315), and an image receiving coating (320) all layered on the image receiving side (345) of the photo paper (300). The photo paper (300) further comprises a second top coat (325), and a second polyethylene coating (330) layered on the side of the photo paper (300) opposite that of the image receiving side (345). These various coatings will now be described in more detail.

The substrate (305) may be made of any type of pulp material which may be suitable for layering a first top coat (310), a first polyethylene coating (315), an image receiving coating (320), a second top coat (325), or a second polyethylene coating (330) thereon. Therefore, the material with which the substrate (305) is made is resilient enough to both support the various coatings used in the examples as well as be able to withstand the mechanical stresses associated with the printing process. Additionally, the thickness as well as the size of the substrate (305) may vary according to the purpose with which the photo paper (300) will be used. Still further, the substrate (305) may or may not include a filler such as clay, kaolin, calcium carbonate ($CaCO_3$), gypsum (hydrated calcium sulfate), talc, zeolite, titanium oxide or mixture.

The first top coat (310) may be similar to the other top coats (115, 215, 235) in both FIGS. 1 and 2, and may be deposited directly on top of the substrate (305). Therefore, the first top coat (310) may be comprised of ground calcium carbonate (GCC), precipitated calcium carbonate (PCC), clay, synthetic polymers, a water dispersible binder, a water soluble binder, an adhesion promoter and slip aid, an optical brightener, a colorant or dye, or combinations thereof. The ground and precipitate calcium carbonate as well as the clay, if used, will act as a pigment and has a particle size of 0.5 μm. Also, the water dispersible and water soluble binders may consist of a latex, a mixture of a latex and starch, or a mixture of a latex and polyvinyl alcohol (PVA). Additionally, the latex used in the first top coat (310) may be an acrylic latex so as to avoid any color distortions of the printed image due to changes in temperature. Still further, the total amount colorant or dye may contain up to 10% of a plastic pigment to increase surface gloss of the final product as well as better adhere the first top coat (310) to the first polyethylene coating (315) or the substrate (305). Still further, small amounts of a plasticizer, a foaming control agent, and a thickener may also be added.

In one example, the first top coat (310) may include 100 parts (approximately 88.1% by weight) of a precipitated calcium carbonate such as OPACARB® A40 or OPACARB® 3000 by Specialty Minerals Inc. (SMI); 3 parts (approximately 2.6% by weight) of a synthetic polymer such as DOW HS3020 NA by Dow Corning Corporation (DOW); 9 parts (approximately 7.9% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as a combination of polyvinyl alcohol with methanol sold under the trade name MOWIOL® 6-98 by KSE; and 0.5 parts (approximately 0.4% by weight) of calcium stearate ($C_{36}H_{70}CaO_4$). In this particular example, the first top coat's (310) coat weight is 15 gsm (grams per square meter). In other examples, the first top coat's (310) coat weight may be up to 25 grams per square meter (gsm).

In another example, the first top coat (310) may include 70 parts (approximately 63.1% by weight) of a precipitated calcium carbonate such as OPACARB® A40 or OPACARB® 3000 by Specialty Minerals Inc. (SMI); 30 parts (approximately 27.0% by weight) of a clay such as MIRAGLOSS® by Engelhard Corporation; 10 parts (approximately 9.0% by weight) of a water dispersible binder such as an acrylic polymer in water sold under the trade name RAYCRYL® 48083 by Specialty Polymers; 0.5 parts (approximately 0.5% by weight) of calcium stearate ($C_{36}H_{70}CaO_4$); 0.5 parts (approximately 0.5% by weight) of an optical brightener such as tetrasulfonated stilbene compound commercially available under the designation Tinopal ABP-A from Chemische Industrie Basel (Ciba); and 0.005 parts (approximately 0.005% by weight) of a colorant or dye such as IRGALITE® Blue Dye by Chemische Industrie Basel (Ciba). In this particular example, the first top coat's (310) coat weight is 15 gsm (grams per square meter). In other examples, the first top coat's (310) coat weight may be up to 25 grams per square meter (gsm).

In yet another example, the first top coat (310) may include 70 parts (approximately 69.3% by weight) of a precipitated calcium carbonate such as OPACARB® A40 or OPACARB® 3000 by Specialty Minerals Inc. (SMI); 20 parts (approximately 19.8% by weight) of a clay such as MIRAGLOSS® by Engelhard Corporation; 10 parts (approximately 9.9% by weight) of a water dispersible binder such as an acrylic polymer in water sold under the trade name RAYCRYL® 48083 by Specialty Polymers; 0.5 parts (approximately 0.5% by weight) of calcium stearate ($C_{36}H_{70}CaO_4$); 0.5 parts (approximately 0.5% by weight) of an optical brightener such as tetrasulfonated stilbene compound commercially available under the designation Tinopal ABP-A from Chemische Industrie Basel (Ciba); and 0.005 parts (approximately 0.005% by weight) of a colorant or dye such as IRGALITE® Blue Dye by Chemische Industrie Basel (Ciba). In this particular example, the first top coat's (310) coat weight is 15 gsm (grams per square meter). In other examples, the first top coat's (310) coat weight may be up to 25 grams per square meter (gsm).

In still another example, the first top coat (310) may include 40 parts (approximately 34.3% by weight) of ground calcium carbonate such as HYDROCARB® 60 by Omya, Inc.; 60 parts (approximately 51.5% by weight) of a clay such as MIRAGLOSS® by Engelhard Corporation; 3 parts (approximately 2.6% by weight) of a synthetic polymer such as DOW HS3020 NA by Dow Corning Corporation (DOW); 5 parts (approximately 4.3% by weight) of an aqueous dispersion of an n-butyl acrylate-acrylonitrile-styrene copolymer commercially available under the trade name ACRONAL® S 504 by Baden Aniline and Soda Factory (BASF); 8 parts (approximately 6.9% by weight) of a water soluble binder such as 2-hydroxyethyl starch ether sold under the trade name of PENFORD® Gum 280 by Penford Products Co.; and 0.5 parts (approximately 0.4% by weight) of calcium stearate ($C_{36}H_{70}CaO_4$). In this particular example, the first top coat's (310) coat weight is 15 gsm (grams per square meter). In other examples, the first top coat's (310) coat weight may be up to 25 grams per square meter (gsm).

In still another example, the first top coat (310) may include, 65 parts (approximately 57.5% by weight) of ground calcium carbonate such as HYDROCARB® 60 by Omya, Inc.; 35 parts (approximately 31.0% by weight) of precipitated calcium carbonate such as OPACARB® A40 or OPACARB® 3000 by Specialty Minerals Inc. (SMI); 3 parts (approximately 2.7% by weight) of a synthetic polymer such as DOW HS3020 NA by Dow Corning Corporation (DOW); 9 parts (approximately 8.0% by weight) of a water dispersible binder such as an aqueous dispersion of a copolymer of styrene and 1,3 butadiene sold under the trade name Litex PX 9330 by Baden Aniline and Soda Factory (BASF); and 1 part (approximately 0.9% by weight) of a water soluble binder such as a combination of polyvinyl alcohol with methanol sold under the trade name MOWIOL® 6-98 by KSE. In this particular example, the first top coat's (310) coat weight is 15 gsm (grams per square meter). In other examples, the first top coat's (310) coat weight may be up to 25 grams per square meter (gsm).

A first polyethylene (PE) layer (315) may then be deposited on top of the first top coat (310) with an image receiving coating (320) deposited over that first polyethylene coating (315). In addition, a second top coat (325) may be added to the substrate (305) opposite the image receiving side (345). The second top coat (325) may be similar to the composition of the first top coat (310). Therefore, in one example, the second top coat (325) may include 100 parts (approximately 88.1% by weight) of a precipitated calcium carbonate such as OPACARB® A40 or OPACARB® 3000 by Specialty Minerals Inc. (SMI); 3 parts (approximately 2.6% by weight) of a synthetic polymer such as DOW HS3020 NA by Dow Corning Corporation (DOW); 9 parts (approximately 7.9% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as a combination of polyvinyl alcohol with methanol sold under the trade name MOWIOL® 6-98 by KSE; and 0.5 parts (approximately 0.4% by weight) of calcium stearate ($C_{36}H_{70}CaO_4$). In this particular example, the second top coat's (325) coat weight is 15 gsm (grams per square meter). In other examples, the second top coat's (325) coat weight may be up to 25 grams per square meter (gsm).

In another example, the second top coat (325) may include 70 parts (approximately 63.1% by weight) of a precipitated calcium carbonate such as OPACARB® A40 or OPACARB® 3000 by Specialty Minerals Inc. (SMI); 30 parts (approximately 27.0% by weight) of a clay such as MIRAGLOSS® by Engelhard Corporation; 10 parts (approximately 9.0% by weight) of a water dispersible binder such as an acrylic polymer in water sold under the trade name RAYCRYL® 48083 by Specialty Polymers; 0.5 parts (approximately 0.5% by weight) of calcium stearate ($C_{36}H_{70}CaO_4$); 0.5 parts (approximately 0.5% by weight) of an optical brightener such as tetrasulfonated stilbene compound commercially available under the designation Tinopal ABP-A from Chemische Industrie Basel (Ciba); and 0.005 parts (approximately 0.005% by weight) of a colorant or dye such as IRGALITE® Blue Dye by Chemische Industrie Basel (Ciba). In this particular example, the second top coat's (325) coat weight is 15 gsm (grams per square meter). In other examples, the second top coat's (325) coat weight may be up to 25 grams per square meter (gsm).

In yet another example, the second top coat (325) may include 70 parts (approximately 69.3% by weight) of a precipitated calcium carbonate such as OPACARB® A40 or OPACARB® 3000 by Specialty Minerals Inc. (SMI); 20 parts (approximately 19.8% by weight) of a clay such as MIRAGLOSS® by Engelhard Corporation; 10 parts (approximately 9.9% by weight) of a water dispersible binder such as an acrylic polymer in water sold under the trade name RAYCRYL® 48083 by Specialty Polymers; 0.5 parts (approximately 0.5% by weight) of calcium stearate ($C_{36}H_{70}CaO_4$); 0.5 parts (approximately 0.5% by weight) of an optical brightener such as tetrasulfonated stilbene compound commercially available under the designation Tinopal ABP-A from Chemische Industrie Basel (Ciba); and 0.005 parts (approximately 0.005% by weight) of a colorant or dye such as IRGALITE® Blue Dye by Chemische Industrie Basel (Ciba). In this particular example, the second top coat's (325) coat weight is 15 gsm (grams per square meter). In other examples, the second top coat's (325) coat weight may be up to 25 grams per square meter (gsm).

In still another example, the second top coat (325) may include 40 parts (approximately 34.3% by weight) of ground calcium carbonate such as HYDROCARB® 60 by Omya, Inc.; 60 parts (approximately 51.5% by weight) of a clay such as MIRAGLOSS® by Engelhard Corporation; 3 parts (approximately 2.6% by weight) of a synthetic polymer such as DOW HS3020 NA by Dow Corning Corporation (DOW); 5 parts (approximately 4.3% by weight) of an aqueous dispersion of an n-butyl acrylate-acrylonitrile-styrene copolymer commercially available under the trade name ACRONAL® S 504 by Baden Aniline and Soda Factory (BASF); 8 parts (approximately 6.9% by weight) of a water soluble binder such as 2-hydroxyethyl starch ether sold under the trade name of PENFORD® Gum 280 by Penford Products Co.; and 0.5 parts (approximately 0.4% by weight) of calcium stearate ($C_{36}H_{70}CaO_4$). In this particular example, the second top coat's (325) coat weight is 15 gsm (grams per square meter). In other examples, the second top coat's (325) coat weight may be up to 25 grams per square meter (gsm).

In still another example, the second top coat (325) may include, 65 parts (approximately 57.5% by weight) of ground calcium carbonate such as HYDROCARB® 60 by Omya, Inc.; 35 parts (approximately 31.0% by weight) of precipitated calcium carbonate such as OPACARB® A40 or OPACARB® 3000 by Specialty Minerals Inc. (SMI); 3 parts (approximately 2.7% by weight) of a synthetic polymer such as DOW HS3020 NA by Dow Corning Corporation (DOW); 9 parts (approximately 8.0% by weight) of a water dispersible binder such as an aqueous dispersion of a copolymer of styrene and 1,3 butadiene sold under the trade name Litex PX 9330 by Baden Aniline and Soda Factory (BASF); and 1 part (approximately 0.9% by weight) of a water soluble binder such as a combination of polyvinyl alcohol with methanol sold under the trade name MOWIOL® 6-98 by KSE. In this particular example, the second top coat's (325) coat weight is 15 gsm (grams per square meter). In other examples, the second top coat's (325) coat weight may be up to 25 grams per square meter (gsm).

A second polyethylene coating (330) may be added to the opposite side of the substrate (305) over the second top coat (325) to help in controlling curling of the photo paper (300). Both the first and second polyethylene coatings (315, 330) may be deposited on the photo paper (300) by, for example, an extrusion process. As discussed earlier, the amount of polyethylene deposited onto a substrate (305) can only be increased to a certain level until the distinctness of image no longer increases accordingly. Additionally, it is less economical to add large amounts of polyethylene in an attempt to increase the distinctness of image. Therefore, in one example, the first polyethylene (PE) layer (315) may have a polyethylene (PE) coat weight of anywhere between 12 gsm and 28 gsm (grams per square meter). In another example, the first polyethylene (PE) layer (315) may have a polyethylene (PE) coat weight of anywhere between 12 gsm and 18 gsm (grams per square meter). Still further, in another example, the first polyethylene (PE) layer (315) may have a polyethylene (PE) coat weight of anywhere between 23 gsm and 29 gsm (grams per square meter). PE coat weight In yet another example, the first polyethylene (PE) layer (315) may have a polyethylene (PE) coat weight of 15 gsm (grams per square meter). In yet another example, the first polyethylene (PE) layer (315) may have a polyethylene (PE) coat weight coat weight of 26 gsm (grams per square meter).

The polyethylene (PE) coat weight of the second polyethylene coating (330) is deposited on the side opposite the image receiving side (345) to counter balance the curl generated by polyethylene (PE) layers and ink receiving layer. Therefore, the coat weight of the second polyethylene coating (330) is dependant on the polyethylene (PE) weight first polyethylene (PE) layer (315) as well as the coat weight of the image receiving coating (320). The polyethylene (PE) coat weight ratio between the second polyethylene layer (330) and the first polyethylene layer (315) can be 2 to 1.

Much like FIGS. 1 and 2, Table 5 below shows the normalized individual distinctness of image (DOI) measurements as well as their average for the photo paper (300) of FIG. 3 with a polyethylene coating layer of 15 gsm (grams per square meter).

TABLE 5

| Polyethylene Coating (315) at 15 gsm | Control ($mm^{-1}$/gsm) | FIG. 3 Photo Paper (300, 400) ($mm^{-1}$/gsm) |
|---|---|---|
| Measurement 1 | 0.115 | 0.167 |
| Measurement 2 | 0.109 | 0.201 |
| Measurement 3 | 0.111 | 0.191 |
| Measurement 4 | 0.097 | 0.193 |
| Measurement 5 | 0.123 | 0.200 |
| Average | 0.111 | 0.190 |

Additionally, Table 6 shows the gloss measurements (% per 20 degrees angle measurement) for the photo paper (300) of Table 5.

TABLE 6

| Polyethylene Coating (315) at 15 gsm | Control (Gloss, % at 20°) | FIG. 3 Photo Paper (300, 400) (Gloss, % at 20°) |
|---|---|---|
| Measurement 1 | 18.4 | 25.0 |
| Measurement 2 | 18.6 | 25.1 |
| Measurement 3 | 18.3 | 25.3 |
| Measurement 4 | 18.2 | 25.8 |
| Measurement 5 | 19.2 | 25.9 |
| Average | 18.5 | 25.4 |

Likewise, Table 7 below shows the normalized individual distinctness of image (DOI) measurements as well as their average for the photo paper (300) of FIG. 3 with a polyethylene coating layer of 26 gsm (grams per square meter). The normalized distinctness of image (DOI) measurements showed an increase for the photo paper (300) for both polyethylene coat weights as compared to the control design.

TABLE 7

| Polyethylene Coating (315) at 26 gsm | Control ($mm^{-1}$/gsm) | FIG. 1 Photo Paper (300, 400) ($mm^{-1}$/gsm) |
|---|---|---|
| Measurement 1 | 0.105 | 0.145 |
| Measurement 2 | 0.102 | 0.148 |
| Measurement 3 | 0.126 | 0.142 |
| Measurement 4 | 0.098 | 0.144 |
| Measurement 5 | 0.101 | 0.143 |
| Average | 0.106 | 0.144 |

Still further, Table 8 shows the gloss measurements (% per 20 degrees angle measurement) for the photo paper (300) of Table 7.

TABLE 8

| Polyethylene Coating (315) at 15 gsm | Control (Gloss, % at 20°) | FIG. 1 Photo Paper (300, 400) (Gloss, % at 20°) |
|---|---|---|
| Measurement 1 | 24.2 | 27.3 |
| Measurement 2 | 24.3 | 27.1 |

TABLE 8-continued

| Polyethylene Coating (315) at 15 gsm | Control (Gloss, % at 20°) | FIG. 1 Photo Paper (300, 400) (Gloss, % at 20°) |
|---|---|---|
| Measurement 3 | 25.1 | 26.3 |
| Measurement 4 | 24.5 | 27.3 |
| Measurement 5 | 24.7 | 27.0 |
| Average | 24.6 | 27.0 |

Figure 4:
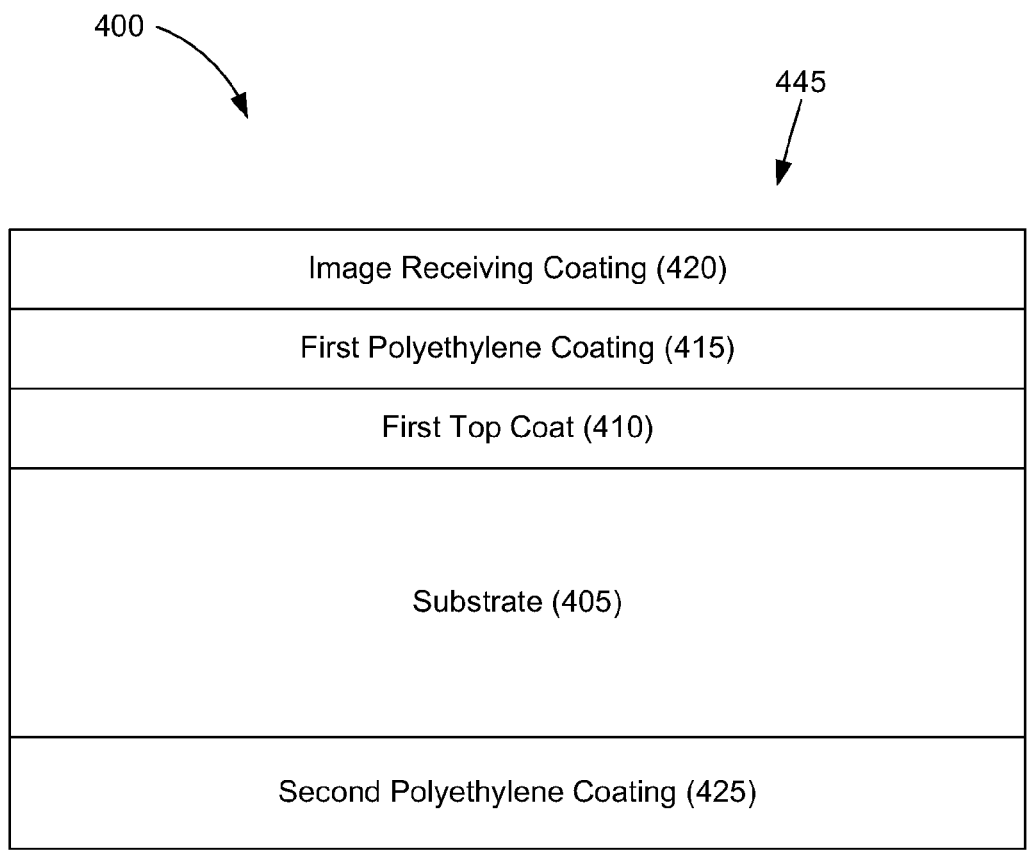
FIG. 4 is an illustrative cross-sectional diagram of a sheet of photo paper, according to another example of principles described herein.

Turning now to FIG. 4, another illustrative cross-sectional diagram of a sheet of photo paper (400) is shown. The photo paper (400) comprises a substrate (405), a first top coat (410), a first polyethylene coating (415), and an image receiving coating (420) all layered on the image receiving side (445) of the photo paper (400). The photo paper (400) further comprises a second polyethylene coating (425) layered on the side of the photo paper (400) opposite that of the image receiving side (445). The substrate (405) and image receiving coating (420) may be similar to the substrate (FIG. 3, 305) and image receiving coating (FIG. 3, 320) of FIG. 3. The first top coat (410) may also be similar to the top coats (115, 215, 235) in FIGS. 1 and 2 as well as the first top coat (310) of FIG. 3.

Therefore, the first top coat (410) may be comprised of ground calcium carbonate (GCC), precipitated calcium carbonate (PCC), clay, synthetic polymers, a water dispersible binder, a water soluble binder, an adhesion promoter and slip aid, an optical brightener, a colorant or dye, or combinations thereof. The ground and precipitate calcium carbonate as well as the clay, if used, will act as a pigment and has a particle size of 0.5 μm. Also, the water dispersible and water soluble binders may consist of a latex, a mixture of a latex and starch, or a mixture of a latex and polyvinyl alcohol (PVA). Additionally, the latex used in the first top coat (410) may be an acrylic latex so as to avoid any color distortions of the printed image due to changes in temperature. Still further, the total amount of coating color may contain up to 10% of a plastic pigment to increase surface gloss of the final product as well as better adhere the first top coat (410) to the first polyethylene coating (415). Still further, small amounts of a plasticizer, a foaming control agent, and a thickener may also be added.

In one example, the first top coat (410) may include 100 parts (approximately 88.1% by weight) of a precipitated calcium carbonate such as OPACARB® A40 or OPACARB® 3000 by Specialty Minerals Inc. (SMI); 3 parts (approximately 2.6% by weight) of a synthetic polymer such as DOW HS3020 NA by Dow Corning Corporation (DOW); 9 parts (approximately 7.9% by weight) of a water dispersible binder such as an aqueous dispersion of a copolymer of styrene and 1,3 butadiene sold under the trade name Litex PX 9330 by Baden Aniline and Soda Factory (BASF); 1 part (approximately 0.9% by weight) of a water soluble binder such as a combination of polyvinyl alcohol with methanol sold under the trade name MOWIOL® 6-98 by KSE; and 0.5 parts (approximately 0.4% by weight) of calcium stearate ($C_{36}H_{70}CaO_4$). In this particular example, the first top coat's (410) coat weight is 15 gsm (grams per square meter). In other examples, the first top coat's (410) coat weight may be up to 25 grams per square meter (gsm).

In another example, the first top coat (410) may include 70 parts (approximately 63.1% by weight) of a precipitated calcium carbonate such as OPACARB® A40 or OPACARB® 3000 by Specialty Minerals Inc. (SMI); 30 parts (approximately 27.0% by weight) of a clay such as MIRAGLOSS® by Engelhard Corporation; 10 parts (approximately 9.0% by weight) of a water dispersible binder such as an acrylic polymer in water sold under the trade name RAYCRYL® 48083 by Specialty Polymers; 0.5 parts (approximately 0.5% by weight) of calcium stearate ($C_{36}H_{70}CaO_4$); 0.5 parts (approximately 0.5% by weight) of an optical brightener such as tetrasulfonated stilbene compound commercially available under the designation Tinopal ABP-A from Chemische Industrie Basel (Ciba); and 0.005 parts (approximately 0.005% by weight) of a colorant or dye such as IRGALITE® Blue Dye by Chemische Industrie Basel (Ciba). In this particular example, the first top coat's (410) coat weight is 15 gsm (grams per square meter). In other examples, the first top coat's (410) coat weight may be up to 25 grams per square meter (gsm).

In yet another example, the first top coat (410) may include 70 parts (approximately 69.3% by weight) of a precipitated calcium carbonate such as OPACARB® A40 or OPACARB® 3000 by Specialty Minerals Inc. (SMI); 20 parts (approximately 19.8% by weight) of a clay such as MIRAGLOSS® by Engelhard Corporation; 10 parts (approximately 9.9% by weight) of a water dispersible binder such as an acrylic polymer in water sold under the trade name RAYCRYL® 48083 by Specialty Polymers; 0.5 parts (approximately 0.5% by weight) of calcium stearate ($C_{36}H_{70}CaO_4$); 0.5 parts (approximately 0.5% by weight) of an optical brightener such as tetrasulfonated stilbene compound commercially available under the designation Tinopal ABP-A from Chemische Industrie Basel (Ciba); and 0.005 parts (approximately 0.005% by weight) of a colorant or dye such as IRGALITE® Blue Dye by Chemische Industrie Basel (Ciba). In this particular example, the first top coat's (410) coat weight is 15 gsm (grams per square meter). In other examples, the first top coat's (410) coat weight may be up to 25 grams per square meter (gsm).

In still another example, the first top coat (410) may include 40 parts (approximately 34.3% by weight) of ground calcium carbonate such as HYDROCARB® 60 by Omya, Inc.; 60 parts (approximately 51.5% by weight) of a clay such as MIRAGLOSS® by Engelhard Corporation; 3 parts (approximately 2.6% by weight) of a synthetic polymer such as DOW HS3020 NA by Dow Corning Corporation (DOW); 5 parts (approximately 4.3% by weight) of an aqueous dispersion of an n-butyl acrylate-acrylonitrile-styrene copolymer commercially available under the trade name ACRONAL® S 504 by Baden Aniline and Soda Factory (BASF); 8 parts (approximately 6.9% by weight) of a water soluble binder such as 2-hydroxyethyl starch ether sold under the trade name of PENFORD® Gum 280 by Penford Products Co.; and 0.5 parts (approximately 0.4% by weight) of calcium stearate ($C_{36}H_{70}CaO_4$). In this particular example, the first top coat's (410) coat weight is 15 gsm (grams per square meter). In other examples, the first top coat's (410) coat weight may be up to 25 grams per square meter (gsm).

In still another example, the first top coat (410) may include, 65 parts (approximately 57.5% by weight) of ground calcium carbonate such as HYDROCARB® 60 by Omya, Inc.; 35 parts (approximately 31.0% by weight) of precipitated calcium carbonate such as OPACARB® A40 or OPACARB® 3000 by Specialty Minerals Inc. (SMI); 3 parts (approximately 2.7% by weight) of a synthetic polymer such as DOW HS3020 NA by Dow Corning Corporation (DOW); 9 parts (approximately 8.0% by weight) of a water dispersible binder such as an aqueous dispersion of a copolymer of styrene and 1,3 butadiene sold under the trade name Litex PX 9330 by Baden Aniline and Soda Factory (BASF); and 1 part (approximately 0.9% by weight) of a water soluble binder such as a combination of polyvinyl alcohol with methanol sold under the trade name MOWIOL® 6-98 by KSE. In this particular example, the first top coat's (410) coat weight is 15 gsm (grams per square meter). In other examples, the first top coat's (410) coat weight may be up to 25 grams per square meter (gsm).

The first (415) and second (425) polyethylene coatings are similar to those of the first (315) and second (330) polyethylene coatings of FIG. 3. Additionally, because the first polyethylene coating (315) may have a polyethylene (PE) coat weight of 15 gsm (grams per square meter) and 26 gsm (grams per square meter), tables 5 through 8 above show comparable normalized distinctness of image (DOI) and gloss measurements for a sheet of photo paper (400) depicted in FIG. 4. Specifically, Tables 5 and 7 show comparable normalized distinctness of image (DOI) measurements as well as their average for the photo paper (400) of FIG. 4 with a polyethylene coating layer of 15 gsm (grams per square meter) and 26 gsm (grams per square meter) respectively. The normalized distinctness of image (DOI) measurements showed an increase for the photo paper (400) at both polyethylene coat weights as compared to the control design. Additionally, Tables 6 and 8 show the gloss measurements (% per 20 degrees angle measurement) for the photo paper (400) of FIG. 4 with a polyethylene coating layer of 15 gsm (grams per square meter) and 26 gsm (grams per square meter) respectively.

In the examples discussed above in connection with FIGS. 1, 2, 3 and 4, the addition of either a top coat, a pre-coat, or a combination of both allows for a higher distinctness of image (DOI) and normalized distinctness of image (DOI) value than would have otherwise been achieved if only a polyethylene coating had been applied to the substrate. Therefore, the addition of these layers not only meets or exceeds the distinctness of image (DOI) and normalized distinctness of image (DOI), but also provides a more economical way of achieving a higher distinctness of image (DOI) while at the same time not requiring larger amounts of polyethylene to be applied to the photo paper. Additionally, after the substrate has been coated with the top-coat layer or the pre coat has been coated with the top coat layer, the surface roughness of the substrate paper is less than 1.5 μm to enable higher DOI and gloss after first PE layer and image receiving coating is applied.

This specification and accompanying figures describe a principles regarding, and various examples of, photo paper. The photo paper has a pre-coat and a top coat deposited on a substrate of the image receiving side of the photo paper which provides for a higher distinctness of image. This photo paper may have a number of advantages, including, for example, a higher distinctness of image than compared to a substrate with only a layer of polyethylene on it. The photo paper may additionally provide for a less expensive product because smaller amounts of polyethylene are being used to achieve the same or better distinctness of image (DOI).

The preceding description has been presented only to illustrate and describe examples of the principles described. This description is not intended to be exhaustive or to limit these principles to any precise form disclosed. Many modifications and variations are possible in light of the above teaching.

What is claimed is:

1. Photo paper comprising:
   a substrate;
   a pre-coat deposited on the image receiving side of the substrate in which the pre-coat comprises ground calcium carbonate (GCC);
   a top coat deposited on the pre-coat;
   a polyethylene coating deposited on the top coat; and
   an image receiving coating deposited on the polyethylene coating.

2. The photo paper of claim 1, in which the pre-coat further comprises pigment having an average particle size of 1.5 μm or less.

3. The photo paper of claim 1, in which coat weight for the pre-coat has a coat weight of up to 25 gsm.

4. The photo paper of claim 1, in which the pre-coat further comprises a water dispersible binder, a water soluble binder, an optical brightener, a dye, or combinations thereof.

5. The photo paper of claim 1, in which the top coat further comprises a pigment having an average particle size of 0.5 μm or less.

6. The photo paper of claim 5, in which the pigment is a clay, calcium carbonate, plastic pigment, or combinations thereof.

7. The photo paper of claim 1, in which the top coat has a coat weight of up to 20 gsm.

8. The photo paper of claim 1 in which the polyethylene coating has a polyethylene (PE) weight of up to 30 grams per square meter.

9. The photo paper of claim 1 in which the surface roughness after the top coat has been deposited is less than 1.5 μm as measured by the Parker Print Surf method.

10. A sheet of photo paper comprising:
    a substrate;
    a pre-coat deposited on the image receiving side of the substrate;
    a top coat deposited on the image receiving side of the substrate the top coat comprising precipitated calcium carbonate (PCC);
    a polyethylene coating deposited on the top coat; and
    an image receiving coating deposited on the polyethylene coating.

11. The photo paper of claim 10, in which the top coat further comprises a pigment having a particle size of 0.5 μm or less.

12. The photo paper of claim 10, in which the surface roughness after the top coat has been deposited is less than 2.5 μm as measured by the Parker Print Surf method.

13. The photo paper of claim 10, in which normalized distinctness of image (DOI) is greater or equal to 0.14 mm$^{-1}$/gsm polyethylene (PE) weight.

14. The photo paper of claim 10, in which the polyethylene coating has coat weight of between 12 and 30 grams per square meter.

15. A method of making a sheet of the photo paper of claim 1, the method comprising:
    layering the pre-coat onto the substrate;
    layering the top coat onto the pre-coat;
    layering the polyethylene coating onto the top coat; and
    layering the image receiving coating onto the polyethylene coating.

* * * * *